Dec. 28, 1948.　　　R B. WORDEN　　　2,457,428
FISHING HOOK AND FLY
Filed Feb. 3, 1947
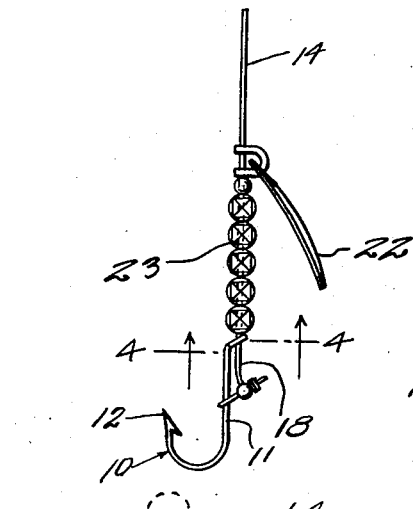
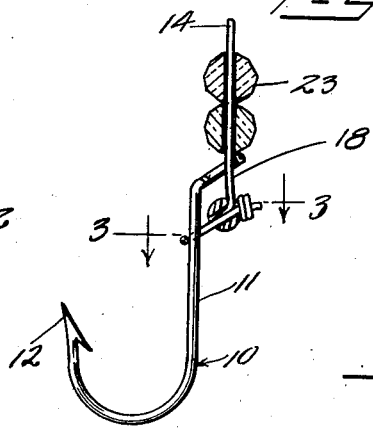
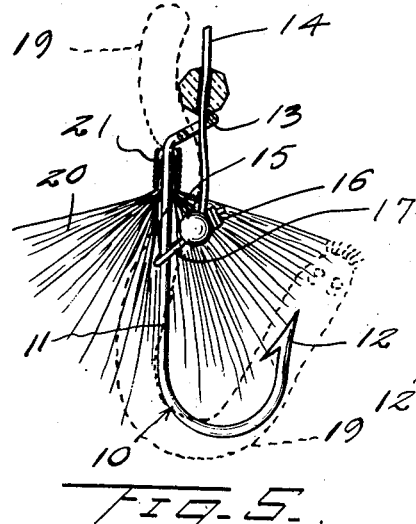
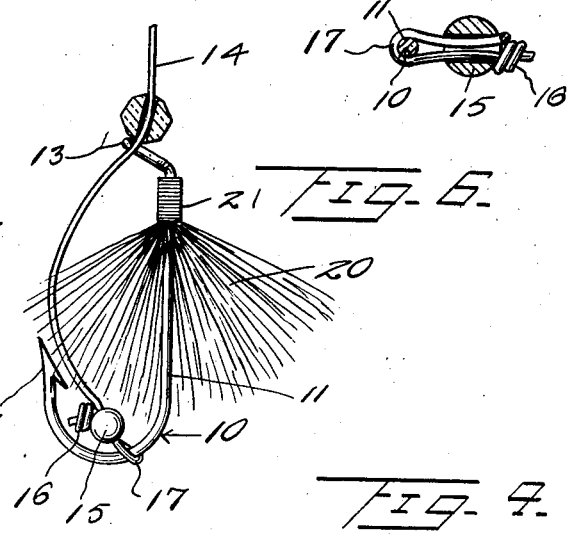
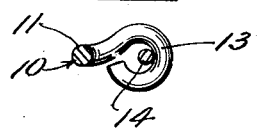
Inventor
R. B. Worden
By Wilfred E. Lawson
Attorney Patented Dec. 28, 1948

2,457,428

UNITED STATES PATENT OFFICE 2,457,428

FISHING HOOK AND FLY

R B. Worden, Granger, Wash.

Application February 3, 1947, Serial No. 726,163

1 Claim. (Cl. 43—28)

This invention relates generally to the class of fishing and trapping and pertains particularly to improvements in fishing hooks and flies.

A principal object of the present invention is to provide an improved fishing hook of the snelled type in which the snell is slidably connected with the hook shank in a novel manner whereby a sliding connection is provided which facilities the formation of a loop adjacent to the hook shank, into which may be secured a bait such as an angle-worm, fish eggs or the like.

Another object of the invention is to provide an improved fishing fly in which the snell is slidably attached to the shank of the hook to facilitate the formation of a loop in which a body of a bait may be secured, such bait body when secured to the shank under the hair or feathers forming the fly, then appearing as the body of the fly.

The invention will be best understood from a consideration of the following detailed description taken in connection with the accompanying drawing forming a part of this specification, with the understanding that the invention is not to be confined to a strict conformity with the showing of the drawing but that minor changes and modifications may be made therein so long as such changes and modifications are within the scope of the invention as expressed in the appended claim.

In the drawing:

Figure 1 is a view in side elevation of a hook and snell constructed in accordance with the present invention.

Figure 2 is a view upon an enlarged scale corresponding to Figure 1 but showing parts in section.

Figure 3 is a sectional view taken on a line 3—3 of Figure 2.

Figure 4 is a sectional view taken on the line 4—4 of Figure 1.

Figure 5 is a view partly in side elevation and partly in section illustrating the application of the invention to a fly.

Figure 6 is a view illustrating the manner of bowing the snell to facilitate the attachment of bait.

Referring now more particularly to the drawing the numeral 10 generally designates a fish hook having a shank portion 11 which at one end merges into the barbed point 12 while at its other end it is formed to provide the usual obliquely directed eye 13 which in the form shown in Figures 1 and 2, lies upon the side of the shank remote from the hook point.

In accordance with the present invention an end of a snell or leader 14 is extended through the hook eye 13 and is then passed through a bead 15, formed into a loop and extended back through the bead and knotted at its end as indicated at 16. The loop 17 thus formed is suitably enlarged by sliding one side through the bead, so that it can be slipped over the point 12 of the hook onto the shank after which the loop 17 is drawn up to closely surround the shank of the hook so that the end of the snell cannot then slip off of the hook point but is permitted free sliding movement lengthwise of the shank.

By this novel manner of slidably coupling the end of the snell with the shank of the hook it will be seen that when the loop 17 is slipped down away from the eye 13 the snell can be sprung or curved outwardly away from the shank to provide the bow 18 without having a sharp angle between one of its ends and the adjacent shank to which it is attached. A body of bait such as a mass of salmon eggs may then be placed in the bow between the latter and the hook shank whereupon, by drawing the snell back through the eye 13 the bow will be closed in toward the hook shank so as to grip or bind the mass of bait to the hook. Also, as will be readily apparent, any other bait body may be attached to the hook and secured in the same manner such, for example, as an angle-worm or blood worm as designated at 19, into the body of which the point of the hook may be forced and one end of the body wrapped around the hook shank and between the shank and the bow 18 to be bound thereto by the process of closing the bow by drawing the loop 17 up toward the eye 13.

It will also be readily aparent that the present invention may very effectively be used in association with hooks having feathers or hair secured thereto to form a fly. In Figures 5 and 6 a fly is illustrated wherein the hairs 20 are bound to the shank of the hook as at 21, in the usual manner and wherein the eye 13 is inclined towards the side of the shank nearest to the hook. With this arrangement when the snell is pulled back through the eye 13, the loop 17 will run up under and be covered by the hair and it will be readily seen that when a body of bait is secured to the shank between the latter and the bow, such bait body will simulate the body of an insect and thus complete the form and design of the artificial fly.

It is also within the purview of the present invention to use upon the snell or leader 14 a spinner 22 and beads 23.

From the foregoing it will be readily apparent that with the present novel method of slidably coupling the end of the snell or leader to the hook shank, when the bow 18 is formed the knot swings outward away from the hook shank so as to form the portion of the snell between the loop 17 and the eye 13 into a perfect bow instead of causing the snell to form a sharp bend at its point of connection with the shank as would be the case if the leader were tied directly to the shank or bound to a slide member mounted on the shank. Also, as will be readily apparent, when the leader wears at the loop 17 or where the spoon revolves around it, the loop 17 can be easily and quickly enlarged by pulling one side of the leader through the bead so that the worn portion can be cut out and a new loop easily and quickly formed which can be slipped back over the point of the hook to re-establish a sliding connection between the shank and the leader.

I claim:

In fishing tackle, a hook having a shank and an eye formed at one end of the shank, a snell passing freely through the eye and a bead having the end of the snell passed through the bead in one direction and back in the opposite direction to form a loop, the free end of the snell being knotted, and said hook shank passing through said loop whereby the looped and bead carrying end of the snell has sliding movement on the hook shank.

R. B. WORDEN.

REFERENCES CITED

The following references are of record in the file of this patent:

UNITED STATES PATENTS

| Number | Name | Date |
|---|---|---|
| 1,295,370 | Porter | Feb. 25, 1919 |
| 2,333,503 | Worden | Nov. 2, 1943 |

OTHER REFERENCES

Shakespeare Catalog No. 38A, copyright 1937, page 35, item 18 titled "Turle knot." Shakespeare Co., Kalamazoo, Michigan. See Catalogs, Class 43. Abercrombie & Fitch Co. Catalog 1937, page 19, item titled "Figure eight knot for salmon flies." Madison Avenue at 45th St., New York, N. Y. See Catalogs, Class 43.